United States Patent
Dillard

(10) Patent No.: US 12,132,720 B2
(45) Date of Patent: Oct. 29, 2024

(54) ENHANCED SECURITY FOR DEVICE AUTHORIZATION FOR BROWSERLESS OR INPUT-CONSTRAINED DEVICES

(71) Applicant: KYOCERA Document Solutions Inc., Osaka (JP)

(72) Inventor: Olga Dillard, Concord, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 345 days.

(21) Appl. No.: 17/693,387

(22) Filed: Mar. 13, 2022

(65) Prior Publication Data

US 2023/0291723 A1  Sep. 14, 2023

(51) Int. Cl.
*H04L 9/40* (2022.01)

(52) U.S. Cl.
CPC ...... *H04L 63/0807* (2013.01); *H04L 63/0815* (2013.01); *H04L 63/102* (2013.01)

(58) Field of Classification Search
None
See application file for complete search history.

(56) References Cited

U.S. PATENT DOCUMENTS

| | | | | | |
|---|---|---|---|---|---|
| 8,370,907 | B1 * | 2/2013 | Potter | ................. | G06F 11/3055 725/108 |
| 8,745,401 | B1 * | 6/2014 | Hintz | .................... | H04L 9/3297 713/172 |
| 9,432,339 | B1 * | 8/2016 | Bowness | ............. | H04L 63/0838 |
| 9,882,882 | B2 * | 1/2018 | Gupta | .................... | H04L 67/563 |
| 10,104,084 | B2 | 10/2018 | Biggs et al. | | |
| 10,454,940 | B2 | 10/2019 | Lander et al. | | |
| 10,554,641 | B2 * | 2/2020 | Farrell | ................ | H04L 63/0853 |
| 10,708,774 | B2 * | 7/2020 | Koo | ..................... | H04W 12/068 |
| 10,878,079 | B2 | 12/2020 | Vepa et al. | | |
| 2016/0255245 | A1 * | 9/2016 | Ishibashi | ................. | H04W 8/22 358/1.14 |
| 2018/0248862 | A1 * | 8/2018 | Farrell | ................... | H04L 63/062 |
| 2019/0251248 | A1 * | 8/2019 | Madden | ............... | G06Q 20/385 |
| 2019/0342280 | A1 * | 11/2019 | Shaw | ................... | H04L 63/0807 |
| 2023/0224422 | A1 * | 7/2023 | Fujii | ..................... | H04N 1/4413 726/20 |

OTHER PUBLICATIONS

OAuth 2.0 Simplified (Chapters 16 and 17); retrieved from oauth.com on Apr. 16, 2024; date published Aug. 10, 2017 (Year: 2017).*

* cited by examiner

*Primary Examiner* — James R Turchen
(74) *Attorney, Agent, or Firm* — W. Eric Webostad

(57) ABSTRACT

Systems and methods relate generally to device code flows. In an example, a method relating generally to a device code flow is disclosed. In such a method, a personal identification code is generated by a server responsive to input of a user code and associated credentials from a first user device. The personal identification code is sent to a second user device different from the first user device. Input of the personal identification code via the first user device is requested. A challenge is generated using the personal identification code.

14 Claims, 7 Drawing Sheets

ENHANCED SECURITY FOR DEVICE AUTHORIZATION FOR BROWSERLESS OR INPUT-CONSTRAINED DEVICES

FIELD

The following description relates to device authorization. More particularly, the following description relates to enhanced security for device authorization for browserless or input-constrained devices.

BACKGROUND

A Smart TV may be an example of an input constrained and/or browserless device. A conventional Smart TV does not include a web browser and may not include a conventional keyboard, such as limited to a displayed or virtual keyboard. In such a conventional Smart TV, a user may be limited to using a remote for input of characters in some instances, and this can be annoying when having to input a username and password. Furthermore, this involves having to remember or otherwise access such username and password for input. To avoid having to repetitively input a username and password, which may be thought of as a user's credentials, a conventional device code flow for an OAuth (Open Authorization) 2.0 Device Authorization Grant (formerly known as a "Device Flow") may be used. However, such a conventional device flow may be insufficiently secure for some applications. An Authorization Code Flow with Proof Key for Code Exchange ("PKCE") may be used to enhance security of a conventional Authorization Code Flow; however, this may involve too much overhead and/or be too cumbersome for some applications.

SUMMARY

In accordance with one or more below described examples, a method relating generally to a device code flow is disclosed. In such a method, a personal identification code is generated by a server responsive to input of a user code and associated credentials from a first user device. The personal identification code is sent to a second user device different from the first user device. Input of the personal identification code via the first user device is requested. A challenge is generated using the personal identification code.

In accordance with one or more below described examples, a system relating generally to a device code flow is disclosed. In such a system, each of a first user device, a second user device, and a server have: a respective memory configured to store program code; and a respective processor coupled to the respective memory, wherein, in combination and response to executing program code, configured to initiate operations for implementing a device code flow. The operations include: generating a personal identification code by the server responsive to input of a user code and associated credentials from the first user device; sending the personal identification code to the second user device different from the first user device; requesting input of the personal identification code via the first user device; and generating a challenge using the personal identification code.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

DETAILED DESCRIPTION

Figure 1:
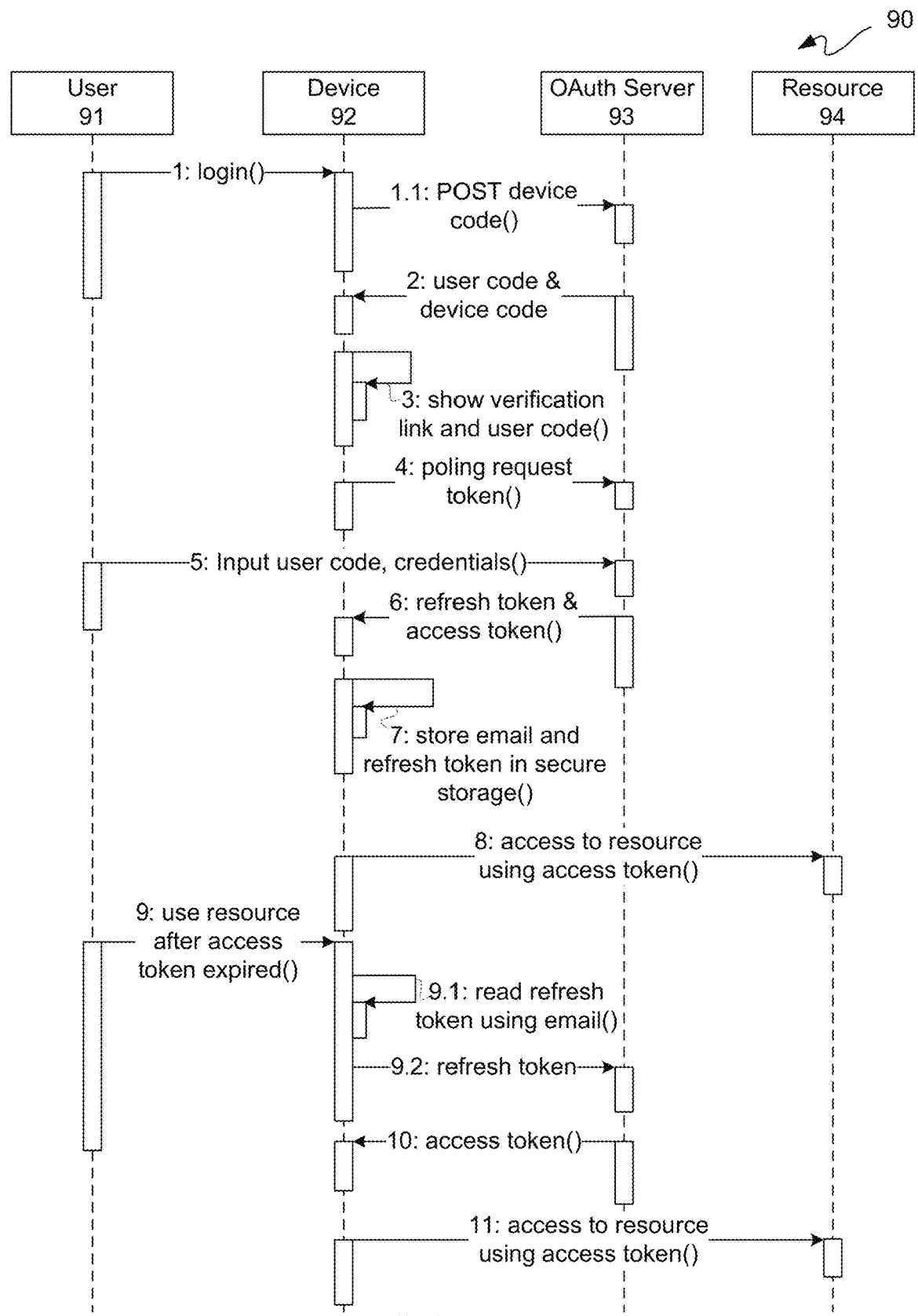
FIG. 1 is a flow-sequence diagram depicting an example of a device code flow previously known by others.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

In some instances, generally in the background of a user device, access and refresh tokens may be used to avoid having to input user credentials each time such a user device is accessed. Open Authorization is an example of a protocol that uses such tokens. However, as previously indicated security may be insufficient in Open Authorization for some applications.

With the above general understanding borne in mind, various configurations for systems, and methods therefor, with enhanced security for a device flow are generally described below for authorization of browserless or input-constrained devices.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc., may be used herein to describe various elements, these elements should not be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers or memories into other data similarly represented as physical quantities within the computer system memories or registers or other such information storage, transmission or display devices.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object-oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, it is understood that the order of these operations may differ from what is depicted. Also, two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule-based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

FIG. 1 is a flow-sequence diagram depicting an example of a device code flow 90 previously known by others. In this example, device code flow 90 is for an OAuth 2.0 Device Authorization Grant (formerly known as a "Device Flow").

Another example may be an Authorization Code Flow with Proof Key for Code Exchange ("PKCE"), which may be used to enhance security of a conventional Authorization Code Flow. Along those lines, for a public client (e.g., a native or single-page app) requesting an access token, additional security may be provided by an Authorization Code Flow with PKCE. A PKCE-enhanced Authorization Code Flow introduces a secret created by a calling application that can be verified by an authorization server; this secret is called a Code Verifier. Additionally, a calling app creates a transform value of a Code Verifier called a Code Challenge and sends this value over HTTPS to retrieve an Authorization Code. This way, a malicious attacker can only intercept an Authorization Code, and they cannot exchange it for a token without a Code Verifier.

Generally, a Device Code grant type is implemented for a browserless or input-constrained device in a device flow. A previously obtained device code is exchanged for an access token in such a device flow. Along those lines, an OAuth 2.0 extension may be used to allow such a browserless or input-constrained device to obtain an access token, such as for example Apple TV apps and other devices, including without limitation hardware encoders, used for streaming video, such as for example to a YouTube or other channel. Device code flow 90 may be implemented in devices such as smart TVs, media consoles, picture frames, printers, or hardware video encoders. In this device code flow 90, a primary device may instruct a user to open a URL on a secondary device, such as a smartphone or computer, in order to complete an authorization. There is no communication channel required between a user's accessible primary and secondary devices.

At 1, a user device 91 may login with user credentials, such as with a user name and password, to an app on a browserless or input-constrained device 92. Prior to such login, a browserless or input-constrained device 92 might not have anyone logged in. Such a browserless or input-constrained device 92 may have an actual panel, a touch screen virtual panel, voice recognition, or other user interface for logging in.

In response to a successful login, such a browserless or input-constrained device 92 posts a device code at 1.1 to an OAuth server (Open Authorization server) 93. At 2, in response to such posting, an OAuth server 93 provides such a browserless or input-constrained device 92 with a user code and a device code.

At 3, browserless or input-constrained device 92 shows a verification link and a user code for a user to request a poling request token. At 4, a poling request may be asserted from browserless or input-constrained device 92 to OAuth server 93 for a poling request token.

At 5, a user may input a user code shown at 3, along with user credentials, such as email address and password for example, for sending to OAuth server 93. In response to a successful authorization, OAuth server 93 may at 6 issue a refresh token and an access token to browserless or input-constrained device 92.

At 7, browserless or input-constrained device 92 may store a user's email and such a refresh token issued at 6, and such email and refresh token may be stored in secure storage. This secure storage may be in memory of such browserless or input-constrained device 92 or in a separate memory device accessible by such browserless or input-constrained device 92. At 8, a browserless or input-constrained device 92 may access to a resource 94 using an access token obtained at 6.

At 9, a user device 91 may request use of a resource after expiration of an access token obtained at 6. Prior to such login, a browserless or input-constrained device 92 might not have anyone logged in. Such a browserless or input-constrained device 92 may have an actual panel, a touch screen virtual panel, voice recognition, or other user interface for logging in.

Rather than repeating the entire process from operation 1, at 9.1 a browserless or input-constrained device 92 may read a refresh token using a user's email address stored at 7. At 9.2, browserless or input-constrained device 92 may send a refresh token to OAuth server 93. In response at 10, an active or unexpired access token may be sent from OAuth server 93 to browserless or input-constrained device 92. This access token is different from an access token sent at 6. At 11, browserless or input-constrained device 92 may gain access to resource 94 using such access token obtained at 10.

Requests for a conventional OAuth2 authentication device code flow 90 may include one or more of the following coding examples.
Request for a device code:
  POST/devicecode
  client_id=*REGISTERED_CLIENTID*
  scope=*SCOPE_1**SCOPE_2*
Request for an access token:
  POST/token
  grant_type=urn:ietfparams:oauth:grant-type:device_code
  client_id=*REGISTERED_CLIENTID*
  device_code=*RECEIVED_DEVICE_CODE*
Request for renewing of an access token:
  POST
  grant_type=refresh_token
  refresh_token=*SAVED_REFRESH_TOKEN*
  client_id=*REGISTERED_CLIENTID*
  scope=*SCOPE_1**SCOPE_2*

Devices with limited input (like an MFP or a TV) may use a conventional device code flow 90 for OAuth2 authentication. Generally, in a conventional device code flow 90, a user receives a link and a code; a user is supposed to open such link using browser on computational device, such as a PC, and then input code. Thereafter, a input-constrained device receives relatively long lived refresh token and comparably short lived access token after a user is authenticated. Such a input-constrained device may use a refresh token to obtain a new access token without user interactions.

Generally, for an OAuth2 authentication procedure, OAuth2 authentication results in two types of tokens, namely an access token and a refresh token. An access token conventionally is valid only for only a short time, such as for example 60 minutes, and is used to access some service a user is authenticated for. A refresh token conventionally can have very long expiration time or no expiration date at all. An access token, when expired, may be used to get a new access token.

For a real-world example, a user may install a calendar application on their smart phone. Such calendar application may ask a user if they want to connect their Gmail or other email account. For purposes of clarity by way of example and not limitation, Gmail is assumed for this example. A user may select/press yes, and such calendar application may take them to the actual Gmail website, where they can input their password. Gmail may ask them if they want to give permissions to this calendar application to read their emails, and such a user may select yes. At this point, their calendar application gets an access token and a refresh token from Gmail, or more particularly a Gmail website OAuth server. Such calendar application then may use such an access token to connect to Gmail and scan, for example, when an amazon package arrives or other event/activity. Next day, a user may open their calendar application, and such calendar application does not ask such user to connect Gmail again, but such calendar application cannot just read Gmail account emails again with the same previously issued access token because yesterday's access token expired. So such calendar application asks Gmail, which ask conventionally occurs in the background without user interaction, to exchange a refresh token for a new access token. A Gmail OAuth server checks that such user has not revoked any permissions and that nothing has changed from yesterday. If both of these conditions are answered in the affirmative, such a Gmail OAuth server sends a new access token to such calendar application. From a user's point of view, they open their calendar application and see dates from Gmail emails, but do not need to input their Gmail password every day.

However, use of such a conventional a conventional device code flow 90 with multiple users is problematic. For example, a printing device, such as an MFP (multi-function printer) for example, often can be used by multiple users. If a conventional device code flow 90 is used in such a multi-user environment, users have can repeatedly log-in and log-out without the possibility of using a refresh token for obtaining an access token. Another option would be to save refresh token in secure storage, one refresh token for each user email. However, this might allow a user to login with only email, which has no protection from unauthorized access, because email is public information and anybody can just type in another's email.

Figure 2:
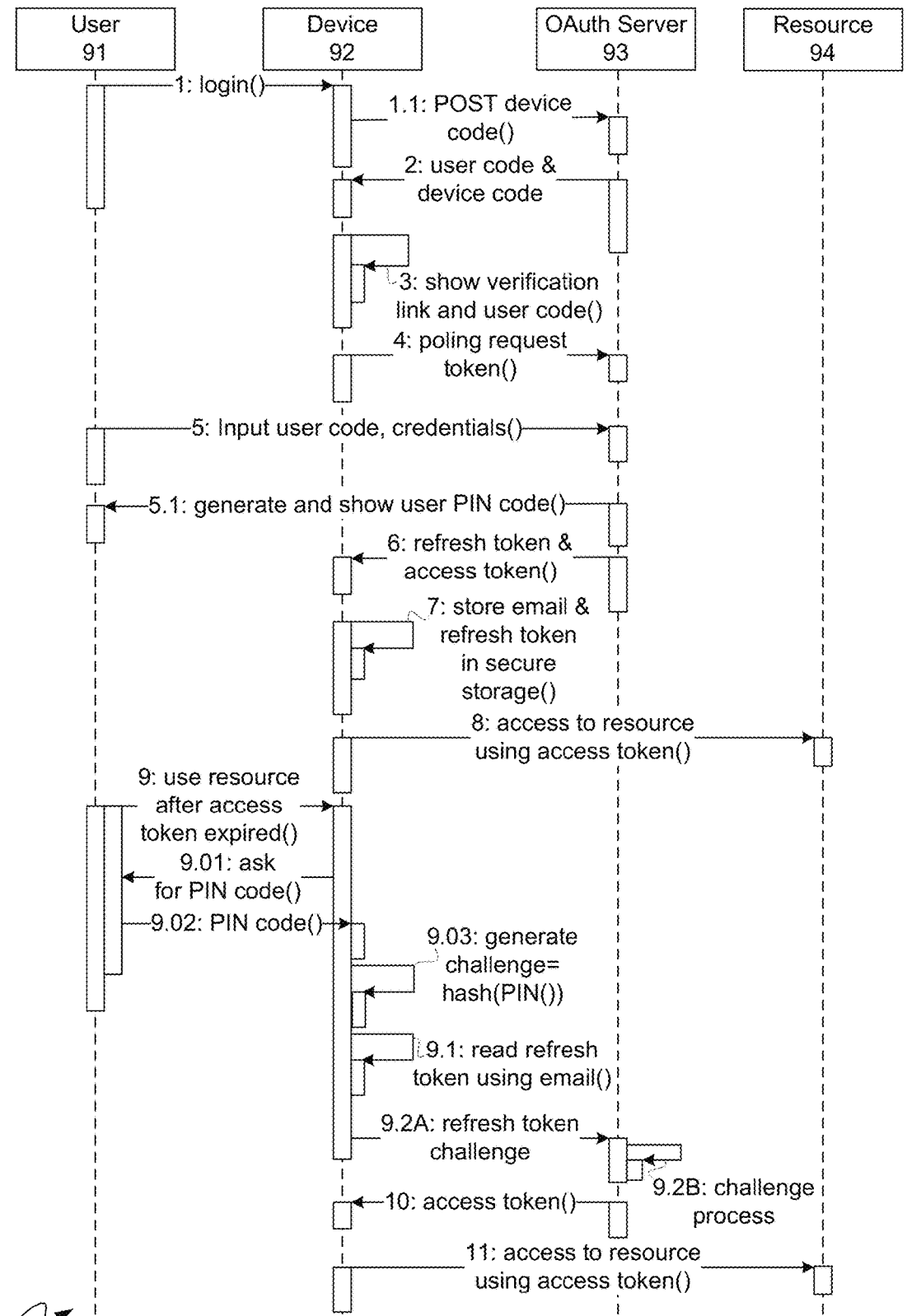
FIG. 2 is a flow-sequence diagram depicting an example of a device code flow.

To overcome one or more of these obstacles or issues, FIG. 2 is a flow-sequence diagram depicting an example of a device code flow 100. Because device code flow 100 has some of the same components as a conventional device code flow 90, device code flow 100 is further described with simultaneous reference to FIGS. 1 and 2.

Operations 1 through 5 may be performed as previously described. After a user inputs a user code and credentials to an OAuth server 93, at 5.1 an OAuth server 93 in reply generates a user personal code, such as for example a personal identification number or PIN code. Another type of code, such as an image or QR or other code may be used. However, for purposes of clarity by way of example and not limitation, an example of a PIN code is used even though other types of codes may be used. Continuing at 5.1, an OAuth server 93 shows or otherwise communicates such PIN code to a user device 91. If an image code or QR code is used, a user may use a smart phone to capture and later input such code out of loop. In other words, a user device 91, such as a smart phone, tablet, smart watch or other out-of-loop device with respect to a browserless or input-constrained device 92 may be provided with such code or used to obtain such code.

Operations 6 through 9 may be performed as previously described after operation 5.1. Operations 1 through 8 are generally for an initial user authentication. At this point, browserless or input-constrained device 92 might not have saved a refresh token for a current user based on user's email address. Between operations 9 and 9.1 may be operations 9.01, 9.02 and 9.03.

At operation 9.01, a browserless or input-constrained device 92 may ask or otherwise inquire of a user device 91 to input a code, such as a PIN code in this example. At operation 9.02, a user device 91 may input or be used to input a PIN code communicated at 5.1 to such a browserless or input-constrained device 92. At operation 9.03, a challenge may be generated. In this example, a challenge is generated by browserless or input-constrained device 92 by hashing a PIN code.

Then operation 9.1 may be used to read a refresh token stored in association with a user's email address, such as an email address for a user-owner of user device 91. Along those lines, an email address may be used as an index or pointer to memory of device 92 to read out an associated refresh token.

At operation 9.2A a challenge generated at 9.03 may be sent by browserless or input-constrained device 92 to OAuth server 93 for a refresh token for a challenge process, and at 9.2B OAuth server 93 may perform a challenge process using such refresh token and such challenge.

Again, a PKCE-enhanced Authorization Code Flow introduces a secret created by a calling application that can be verified by an authorization server; this secret is called a Code Verifier. Additionally, a calling app creates a transform value of a Code Verifier called a Code Challenge and sends this value over HTTPS to retrieve an Authorization Code. This way, a malicious attacker can only intercept an Authorization Code, and they cannot exchange it for a token without a Code Verifier.

Similarly, a hash or other transform value of a code, such as a PIN code in this example, may be used. After a successful challenge process, OAuth server 93 may generate an access token at operation 10 for access to resource 94 at operation 11 as previously described.

Figure 3:
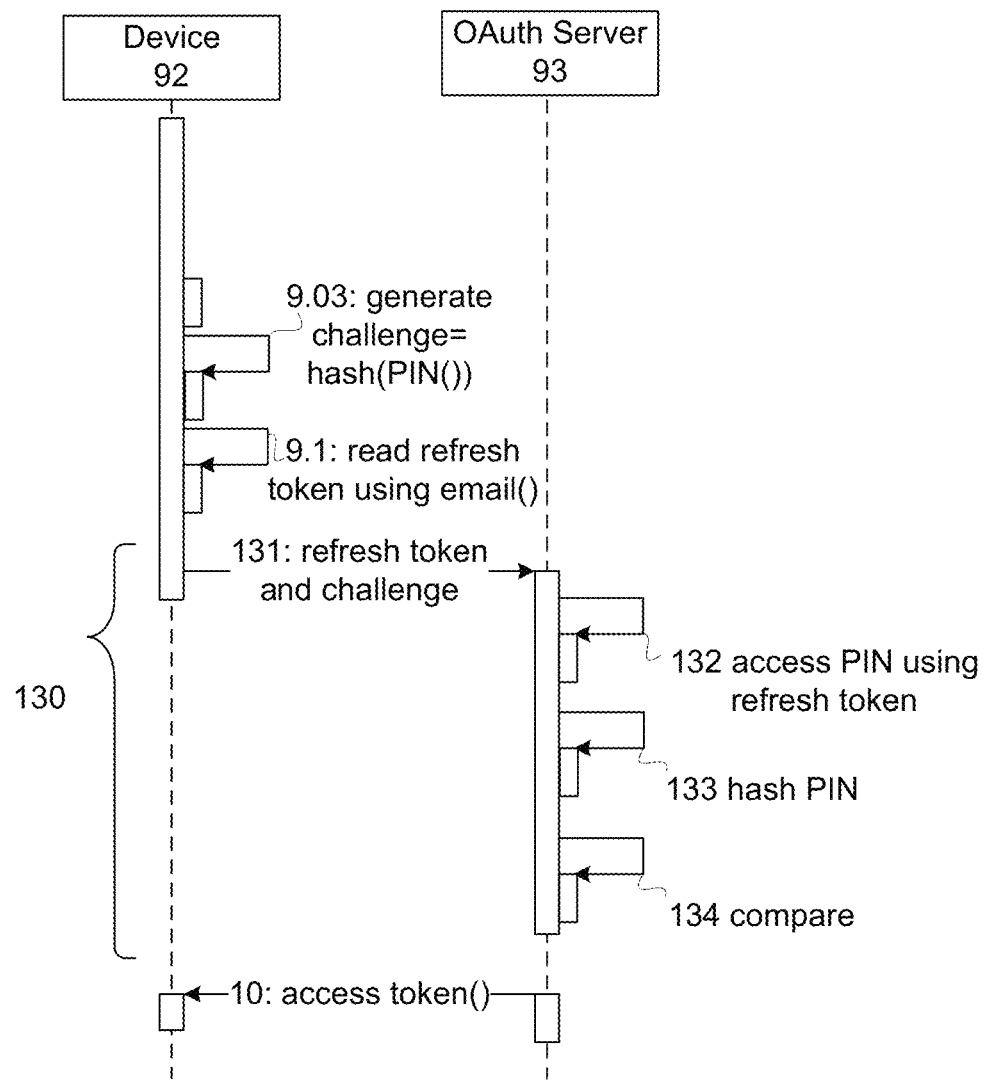
FIG. 3 is a flow-sequence diagram depicting an example of a challenge process flow.

FIG. 3 is a flow-sequence diagram depicting an example of a challenge process flow 130. With simultaneous reference to FIGS. 1 through 3, challenge process flow 130 is further described.

An example of a challenge process 9.2B for this example may be for OAuth server 93 to receive a refresh token and an associated challenge at 131. At 132, OAuth server 93 may access an internal or other stored copy of a PIN code previously generated and associated with such refresh token. Such a refresh token submitted with a challenge may be used as a pointer or index to obtain such a PIN for hashing to generate a challenge answer. At 133, a hash may be performed on such PIN code to obtain a challenge answer, and at 134 such challenge answer may be compared with an associated challenge for an exact match. If there is not an exact match, an email address on file may be sent a message of an attempt to gain access. However, assuming there is an exact match, then at 10 an access token may be sent to a browserless or input-constrained device 92 having sent such challenge and refresh token.

With continuing reference to FIGS. 1 through 3, operations 9 through 10 are for user authentication if device 92 has saved a refresh token for a current user, where such refresh token was received in operation 6. If any of operations 9 through 10 fails, device 92 may attempt device code flow 100 starting from login at operation 1 again.

User might be able to use the same PIN code again and again at operation 9.02 until for some reason use is no longer available. Examples for termination of use of a PIN code may be for when a refresh token expires, an OAuth server 93 invokes updated security rules, or other reason. If exchanging a refresh token for an access token fails at any of operations 9 through 10, a user device 91 may receive a prompt for a user to login again at operation 1, and subsequently input their credentials again starting at operation 5. In such an event, a new PIN or other code may be generated and provided to a user at operation 5.1 in response to a successful sequence of operations 1 through 5.

To recap, a request for a device code adds a code, such as a PIN code. A server sends such a device code and user code to client, and in reply a device provides a user verification link and user cod. A user opens a browser link and inputs therefrom or therein a user code and credentials. After authorization, a server shows a code, such as for example a 6-digit PIN code, which may be thought of as a token_verifier. A token_verifier is out of loop for security reasons, and so a user is supposed to remember such a token_verifier or otherwise have same stored out of loop. During a next login to a device, a user inputs an email address and an associated PIN code or other token_verifier, and a device calculates a challenge, such as a token_challenge, which in this example is hash of a PIN code. A device sends a request to renew or obtain an active access token with two additional parameters, namely a code_challenge and a code_challenge_method, the latter of which in this example is a hash method.

In this manner, a client device, such as a browserless or input-constrained device 92, does not have to store a PIN code. Such PIN code is out-of-loop with respect to such client device for enhanced security. Furthermore, in this example, all logic is located on the server side of device code flow 100, and so device code flow 100 may be universal for different client devices.

A PIN or other code may be randomly generated by OAuth server 93 each and every time a user device 91 has to login. This further enhances security.

Requests for an OAuth2 authentication device code flow 100 may include one or more of the following coding examples.

Request for a device code:
POST/devicecode
client_id=*REGISTERED_CLIENTID*
scope=*SCOPE_1**SCOPE_2*pincode Request for an access token:
POST/token
grant_type=urn:ietfparams:oauth:grant-type:device_code
client_id=*REGISTERED_CLIENTID*
device_code=*RECEIVED_DEVICE_CODE*

Request for renewing of an access token:
POST
grant_type=refresh_token
refresh_token=*SAVED_REFRESH_TOKEN*
client_id=*REGISTERED_CLIENTID* scope=*SCOPE_1**SCOPE_2*pincode
token_challenge=*CHALLENGE*
token_challenge_method=*HASH_METHOD*

Because one or more of the examples described herein may be implemented using an information processing system, a detailed description of examples of each of a network (such as for a Cloud-based SaaS implementation), a computing system, a mobile device, and an MFP is provided. However, it should be understood that other configurations of one or more of these examples may benefit from the technology described herein.

Figure 4:
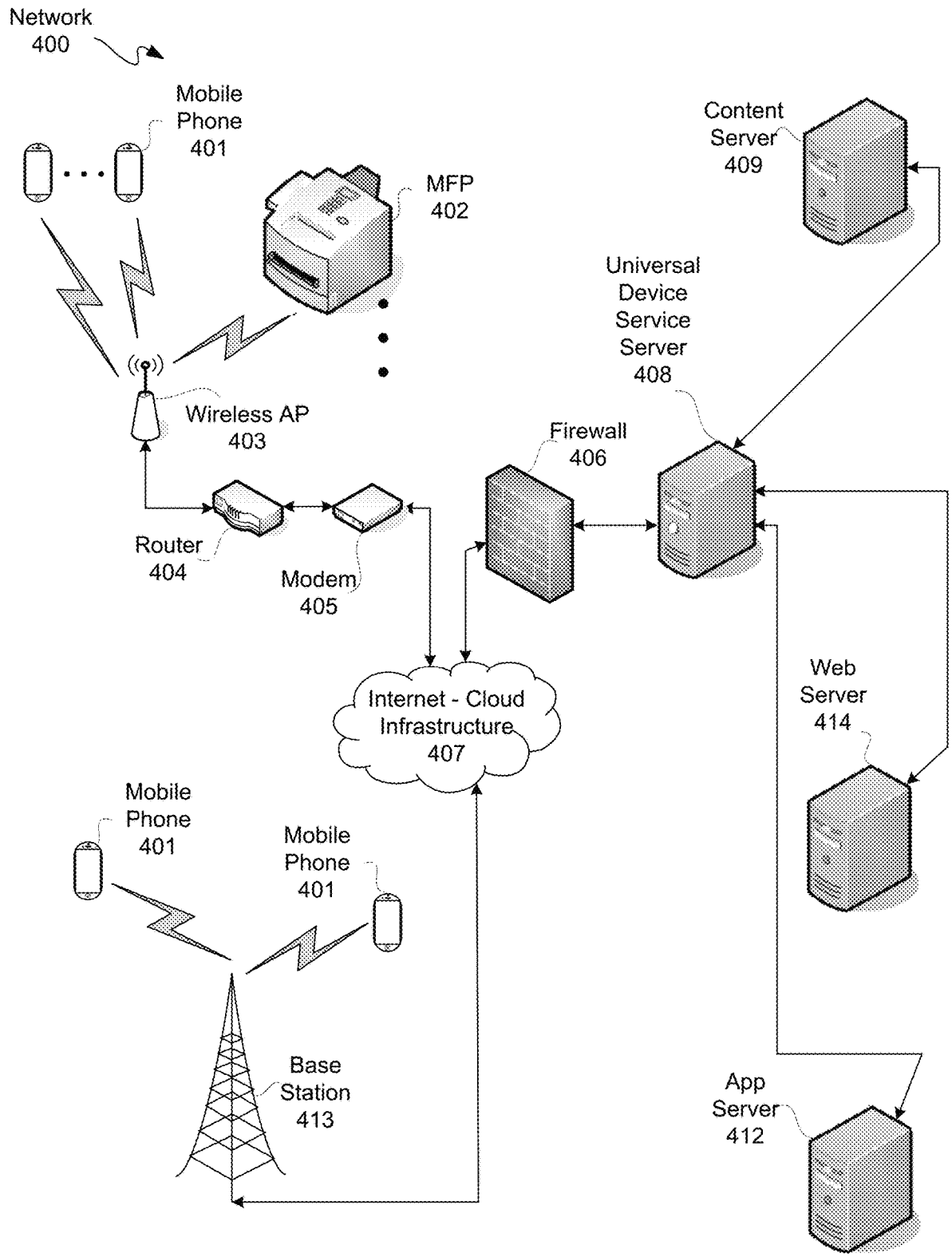
FIG. 4 is a pictorial diagram depicting an example of a network.

FIG. 4 is a pictorial diagram depicting an example of a network 400, which may be used to provide a SaaS platform for hosting a service or micro service for use by a user device, as described herein. Along those lines, network 400 may include one or more mobile phones, pads/tablets, notebooks, and/or other web-usable devices 401 in wired and/or wireless communication with a wired and/or wireless access point ("AP") 403 connected to or of a wireless router. Furthermore, one or more of such web-usable wireless devices 401 may be in wireless communication with a base station 413.

Additionally, a desktop computer and/or a printing device, such as for example one or more multi-function printer ("MFPs") 402, each of which may be web-usable devices, may be in wireless and/or wired communication to and from router 404. An MFP 402 may include at least one plasma head as previously described herein.

Wireless AP 403 may be connected for communication with a router 404, which in turn may be connected to a modem 405. Modem 405 and base station 413 may be in communication with an Internet-Cloud infrastructure 407, which may include public and/or private networks.

A firewall 406 may be in communication with such an Internet-Cloud infrastructure 407. Firewall 406 may be in communication with a universal device service server 408. Universal device service server 408 may be in communication with a content server 409, a web server 414, and/or an app server 412. App server 412, as well as a network 400, may be used for downloading an app or one or more components thereof for accessing and using a service or a micro service as described herein.

Figure 5:
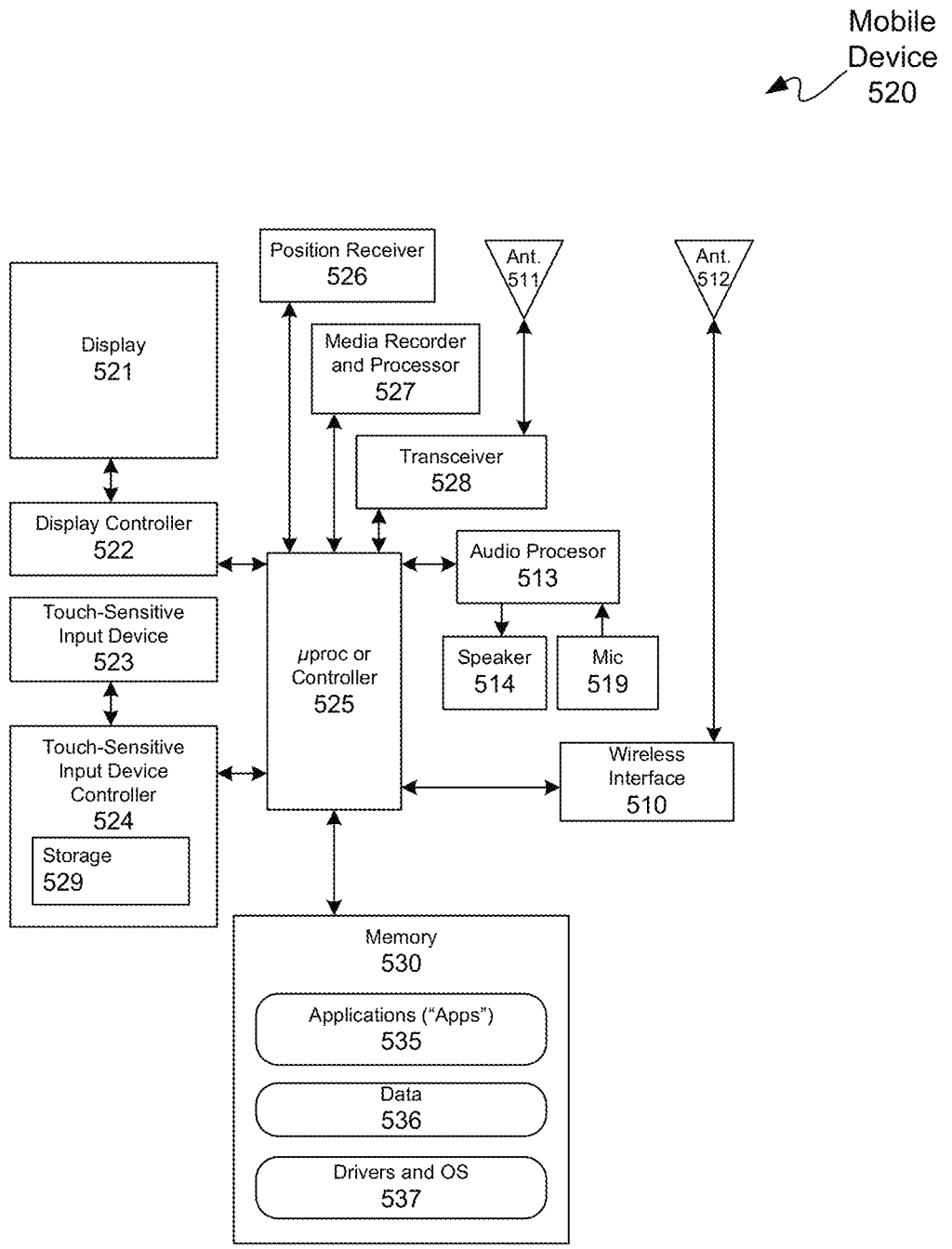
FIG. 5 is block diagram depicting an example of a portable communication device.

FIG. 5 is block diagram depicting an example of a portable communication device ("mobile device") 520. Mobile device 520 may be an example of a mobile device used to instruct a printing device.

Mobile device 520 may include a wireless interface 510, an antenna 511, an antenna 512, an audio processor 513, a speaker 514, and a microphone ("mic") 519, a display 521, a display controller 522, a touch-sensitive input device 523, a touch-sensitive input device controller 524, a microprocessor or microcontroller 525, a position receiver 526, a media recorder 527, a cell transceiver 528, and a memory or memories ("memory") 530.

Microprocessor or microcontroller 525 may be programmed to control overall operation of mobile device 520. Microprocessor or microcontroller 525 may include a commercially available or custom microprocessor or microcontroller.

Memory 530 may be interconnected for communication with microprocessor or microcontroller 525 for storing programs and data used by mobile device 520. Memory 530 generally represents an overall hierarchy of memory devices containing software and data used to implement functions of mobile device 520. Data and programs or apps as described hereinabove may be stored in memory 530.

Memory 530 may include, for example, RAM or other volatile solid-state memory, flash or other non-volatile solid-state memory, a magnetic storage medium such as a hard disk drive, a removable storage media, or other suitable storage means. In addition to handling voice communications, mobile device 520 may be configured to transmit, receive and process data, such as Web data communicated to and from a Web server, text messages (also known as short message service or SMS), electronic mail messages, multimedia messages (also known as MMS), image files, video files, audio files, ring tones, streaming audio, streaming video, data feeds (e.g., podcasts), and so forth.

In this example, memory 530 stores drivers, such as I/O device drivers, and operating system programs ("OS") 537. Memory 530 stores application programs ("apps") 535 and data 536. Data may include application program data.

I/O device drivers may include software routines accessed through microprocessor or microcontroller 525 or by an OS stored in memory 530. Apps, to communicate with devices such as the touch-sensitive input device 523 and keys and other user interface objects adaptively displayed on a display 521, may use one or more of such drivers.

Mobile device 520, such as a mobile or cell phone, includes a display 521. Display 521 may be operatively coupled to and controlled by a display controller 522, which may be a suitable microcontroller or microprocessor programmed with a driver for operating display 521.

Touch-sensitive input device 523 may be operatively coupled to and controlled by a touch-sensitive input device controller 524, which may be a suitable microcontroller or microprocessor. Along those lines, touching activity input via touch-sensitive input device 523 may be communicated to touch-sensitive input device controller 524. Touch-sensitive input device controller 524 may optionally include local storage 529.

Touch-sensitive input device controller 524 may be programmed with a driver or application program interface ("API") for apps 535. An app may be associated with a service, as previously described herein, for use of a SaaS. One or more aspects of above-described apps may operate in a foreground or background mode.

Microprocessor or microcontroller 525 may be programmed to interface directly touch-sensitive input device 523 or through touch-sensitive input device controller 524. Microprocessor or microcontroller 525 may be programmed or otherwise configured to interface with one or more other interface device(s) of mobile device 520. Microprocessor or microcontroller 525 may be interconnected for interfacing with a transmitter/receiver ("transceiver") 528, audio processing circuitry, such as an audio processor 513, and a position receiver 526, such as a global positioning system ("GPS") receiver. An antenna 511 may be coupled to transceiver 528 for bi-directional communication, such as cellular and/or satellite communication.

Mobile device 520 may include a media recorder and processor 527, such as a still camera, a video camera, an audio recorder, or the like, to capture digital pictures, audio and/or video. Microprocessor or microcontroller 525 may be interconnected for interfacing with media recorder and processor 527. Image, audio and/or video files corresponding to the pictures, songs and/or video may be stored in memory 530 as data 536.

Mobile device 520 may include an audio processor 513 for processing audio signals, such as for example audio information transmitted by and received from transceiver 528. Microprocessor or microcontroller 525 may be interconnected for interfacing with audio processor 513. Coupled to audio processor 513 may be one or more speakers 514 and one or more microphones 519, for projecting and receiving sound, including without limitation recording sound, via mobile device 520. Audio data may be passed to audio processor 513 for playback. Audio data may include, for example, audio data from an audio file stored in memory 530 as data 536 and retrieved by microprocessor or microcontroller 525. Audio processor 513 may include buffers, decoders, amplifiers and the like.

Mobile device 520 may include one or more local wireless interfaces 510, such as a WIFI interface, an infrared transceiver, and/or an RF adapter. Wireless interface 510 may provide a Bluetooth adapter, a WLAN adapter, an Ultra-Wideband ("UWB") adapter, and/or the like. Wireless interface 510 may be interconnected to an antenna 512 for communication. As is known, a wireless interface 510 may be used with an accessory, such as for example a hands-free adapter and/or a headset. For example, audible output sound corresponding to audio data may be transferred from mobile device 520 to an adapter, another mobile radio terminal, a computer, or another electronic device. In another example, wireless interface 510 may be for communication within a cellular network or another Wireless Wide-Area Network (WWAN).

Figure 6:
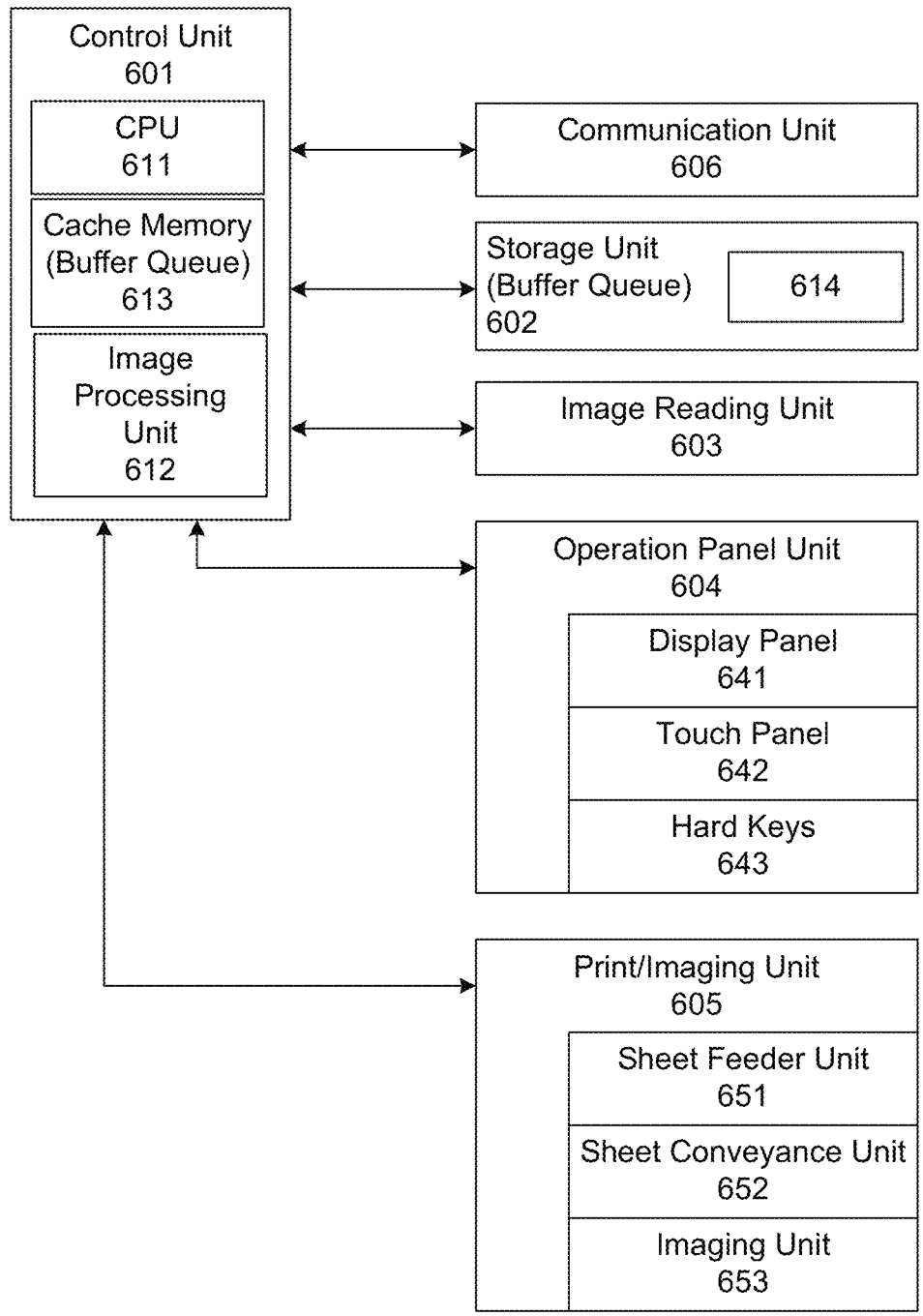
FIG. 6 is a block diagram depicting an example of a multi-function printer (MFP).

FIG. 6 is a block diagram depicting an example of a multi-function printer MFP 600. MFP 600 is provided for purposes of clarity by way of non-limiting example. MFP 600 is an example of an information processing system such as for handling a printer job.

MFP 600 includes a control unit 601, a storage unit 602, an image reading unit 603, an operation panel unit 604, a print/imaging unit 605, and a communication unit 606. Communication unit 606 may be coupled to a network for communication with other peripherals, mobile devices, computers, servers, and/or other electronic devices.

Control unit 601 may include a CPU 611, an image processing unit 612, and cache memory 613. Control unit 601 may be included with or separate from other components of MFP 600. Storage unit 602 may include ROM, RAM, and large capacity storage memory, such as for example an HDD or an SSD. Storage unit 602 may store various types of data and control programs, including without limitation a printer imaging pipeline program 614. A buffer queue may be located in cache memory 613 or storage unit 602.

Operation panel unit 604 may include a display panel 641, a touch panel 642, and hard keys 643. Print/imaging unit 605 may include a sheet feeder unit 651, a sheet conveyance unit 652, and an imaging unit 653.

Generally, for example, for an MFP a copy image processing unit, a scanner image processing unit, and a printer image processing unit may all be coupled to respective direct memory access controllers for communication with a memory controller for communication with a memory. Many known details regarding MFP 600 are not described for purposes of clarity and not limitation.

Figure 7:
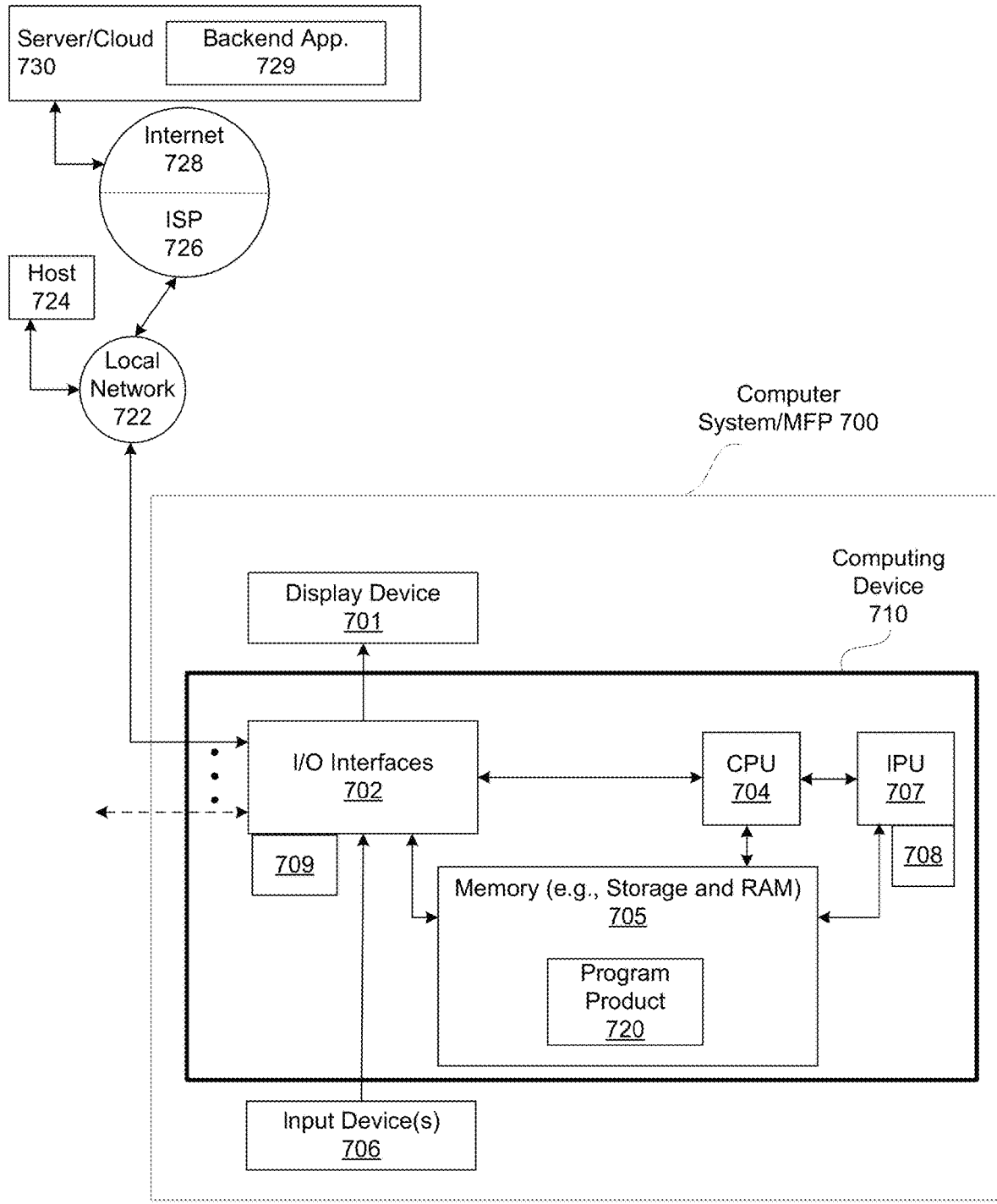
FIG. 7 is a block diagram depicting an example of a computer system.

FIG. 7 is a block diagram depicting an example of a computer system or MFP 700 ("computer system") upon which one or more aspects described herein may be implemented. Computer system 700 may include a programmed computing device 710 coupled to one or more display devices 701, such as Cathode Ray Tube ("CRT") displays, plasma displays, Liquid Crystal Displays ("LCDs"), Light Emitting Diode ("LED") displays, light emitting polymer displays ("LPDs") projectors and to one or more input devices 706, such as a keyboard and a cursor pointing device. Other known configurations of a computer system may be used. Computer system 700 by itself or networked with one or more other computer systems 700 may provide an information handling/processing system.

Programmed computing device 710 may be programmed with a suitable operating system, which may include Mac OS, Java Virtual Machine, Real-Time OS Linux, Solaris, iOS, Darwin, Android Linux-based OS, Linux, OS-X, UNIX, or a Windows operating system, among other platforms, including without limitation an embedded operating system, such as VxWorks. Programmed computing device 710 includes a central processing unit ("CPU") 704, one or more memories and/or storage devices ("memory") 705, and one or more input/output ("I/O") interfaces ("I/O interface") 702. Programmed computing device 710 may optionally include an image processing unit ("IPU") 707 coupled to CPU 704 and one or more peripheral cards 709 coupled to I/O interface 702. Along those lines, programmed computing device 710 may include graphics memory 708 coupled to optional IPU 707.

CPU 704 may be a type of microprocessor known in the art, such as available from IBM, Intel, ARM, and Advanced Micro Devices for example. CPU 704 may include one or more processing cores. Support circuits (not shown) may include busses, cache, power supplies, clock circuits, data registers, and the like.

Memory 705 may be directly coupled to CPU 704 or coupled through I/O interface 702. At least a portion of an operating system may be disposed in memory 705. Memory 705 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 705 may include an SSD, which is coupled to I/O interface 702, such as through an NVMe-PCIe bus, SATA bus or other bus. Moreover, one or more SSDs may be used, such as for NVMe, RAID or other multiple drive storage for example.

I/O interface 702 may include chip set chips, graphics processors, and/or daughter cards, among other known circuits. In this example, I/O interface 702 may be a Platform Controller Hub ("PCH"). I/O interface 702 may be coupled to a conventional keyboard, network, mouse, camera, microphone, display printer, and interface circuitry adapted to receive and transmit data, such as data files and the like.

Programmed computing device 710 may optionally include one or more peripheral cards 709. An example of a daughter or peripheral card may include a network interface card ("NIC"), a display interface card, a modem card, and a Universal Serial Bus ("USB") interface card, among other known circuits. Optionally, one or more of these peripherals may be incorporated into a motherboard hosting CPU 704 and I/O interface 702. Along those lines, IPU 707 may be incorporated into CPU 704 and/or may be of a separate peripheral card.

Programmed computing device 710 may be coupled to a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to programmed computing device 710. However, for purposes of clarity and not limitation, it shall be assumed that an SSD is housed in programmed computing device 710.

Memory 705 may store all or portions of one or more programs or data, including variables or intermediate information during execution of instructions by CPU 704, to implement processes in accordance with one or more examples hereof to provide a program product 720. Program product 720 may be for implementing portions of process flows, as described herein. Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware.

Along those lines, implementations related to use of computing device 710 for implementing techniques described herein may be performed by computing device 710 in response to CPU 704 executing one or more sequences of one or more instructions contained in main memory of memory 705. Such instructions may be read into such main memory from another machine-readable medium, such as a storage device of memory 705. Execution of the sequences of instructions contained in main memory may cause CPU 704 to perform one or more process steps described herein. In alternative implementations, hardwired circuitry may be used in place of or in combination with software instructions for such implementations. Thus, the example implementations described herein should not be considered limited to any specific combination of hardware circuitry and software, unless expressly stated herein otherwise.

One or more program(s) of program product 720, as well as documents thereof, may define functions of examples hereof and can be contained on a variety of non-transitory tangible signal-bearing media, such as computer- or machine-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 720. Such transitory tangible signal-bearing media, when carrying computer-readable instructions that direct functions hereof, represent implementations hereof.

Along those lines the term "tangible machine-readable medium" or "tangible computer-readable storage" or the like refers to any tangible medium that participates in providing data that causes a machine to operate in a specific manner. In an example implemented using computer system 700, tangible machine-readable media are involved, for example, in providing instructions to CPU 704 for execution as part of programmed product 720. Thus, a programmed computing device 710 may include programmed product 720 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 704 for execution. For example, instructions may initially be carried on a magnetic disk or other storage media of a remote computer. The remote computer can load the instructions into its dynamic memory and send such instructions over a transmission media using a modem. A modem local to computer system 700 can receive such instructions on such transmission media and use an infra-red transmitter to convert such instructions to an infra-red signal. An infra-red detector can receive such instructions carried in such infra-red signal and appropriate circuitry can place such instructions on a bus of computing device 710 for writing into main memory, from which CPU 704 can retrieve and execute such instructions. Instructions received by main memory may optionally be stored on a storage device either before or after execution by CPU 704.

Computer system 700 may include a communication interface as part of I/O interface 702 coupled to a bus of computing device 710. Such a communication interface may provide a two-way data communication coupling to a network link connected to a local network 722. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 722 may provide data communication through one or more networks to other data devices. For example, a network link may provide a connection through local network 722 to a host computer 724 or to data equipment operated by an Internet Service Provider ("ISP") 726 or another Internet service provider. ISP 726 may in turn provide data communication services through a world-wide packet data communication network, the "Internet" 728. Local network 722 and the Internet 728 may both use electrical, electromagnetic or optical signals that carry analog and/or digital data streams. Data carrying signals through various networks, which carry data to and from computer system 700, are exemplary forms of carrier waves for transporting information.

Wireless circuitry of I/O interface 702 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WIFI (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WIFI), and/or a long range wireless transceiver (e.g., GSM/GPRS, UMTS, CDMA2000, EV-DO, and LTE/LTE-Advanced) can be used depending on the type of communication or the range of the communication.

Computer system 700 can send messages and receive data, including program code, through network(s) via a network link and communication interface of I/O interface 702. In the Internet example, a server 730 might transmit a requested code for an application program through Internet 728, ISP 726, local network 722 and I/O interface 702. A server/Cloud-based system 730 may include a backend application for providing one or more applications or services as described herein. Received code may be executed by processor 704 as it is received, and/or stored in a storage device, or other non-volatile storage, of memory 705 for later execution. In this manner, computer system 700 may obtain application code in the form of a carrier wave.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method for a device code flow, comprising:
   generating a personal identification code by a server responsive to input of a user code and associated credentials from a first user device;
   sending the personal identification code to a second user device different from the first user device;
   requesting input of the personal identification code via the first user device;
   generating a challenge using the personal identification code;
   sending from the server a refresh token and an access token to the first user device;
   storing an email address associated with the credentials and the refresh token in or in association with the first user device;
   requesting access to a resource by the first user device using the access token;
   requesting of the first user device from the second user device access to the resource after expiration of the access token; and
   asking by the first user device of the second user device input of the personal identification code in response to the requesting.

2. The method according to claim 1, wherein the server is an Open Authorization server.

3. The method according to claim 1, further comprising:
   receiving the personal identification code from the second user device for input to the first user device; and
   generating by the first user device the challenge using the personal identification code.

4. The method according to claim 3, further comprising:
   reading by the first user device the refresh token; and
   sending the refresh token and the challenge to the server.

5. The method according to claim 4, wherein the email address is used as a pointer for locating the refresh token for the reading thereof.

6. The method according to claim 5, further comprising performing a process for the challenge by the server using the refresh token and the challenge.

7. The method according to claim 6, wherein the access token is a first access token, the method further comprising:
   determining authorization by the server from the challenge process;
   generating a second access token by the server; and
   sending the second access token to the first user device.

8. The method according to claim 7, wherein the first user device is a browserless user device.

9. The method according to claim 7, wherein the first user device is an input-constrained user device.

10. A system, comprising:
    each of a first user device, a second user device, and a server having:
      a respective memory configured to store program code; and
      a respective processor coupled to the respective memory, wherein,
    in combination and response to executing program code, configured to initiate operations for implementing a device code flow, including:
      generating a personal identification code by the server responsive to input of a user code and associated credentials from the first user device;
      sending the personal identification code to the second user device different from the first user device;
      requesting input of the personal identification code via the first user device;
      generating a challenge using the personal identification code;
      sending from the server a refresh token and an access token to the first user device;
      storing an email address associated with the credentials and the refresh token in or in association with the first user device;
      requesting access to a resource by the first user device using the access token;
      requesting of the first user device from the second user device access to the resource after expiration of the access token; and
      asking by the first user device of the second user device input of the personal identification code in response to the requesting.

11. The system according to claim 10, wherein the server is an Open Authorization server.

12. The system according to claim 10, wherein the operations further include:
    receiving the personal identification code from the second user device for input to the first user device;
    generating by the first user device the challenge using the personal identification code;
    reading by the first user device the refresh token; and
    sending the refresh token and the challenge to the server;
    wherein the email address is used as a pointer for locating the refresh token for the reading thereof.

13. The system according to claim 12, wherein the operations further include:
    performing a process the challenge by the server using the refresh token and the challenge;
    wherein the access token is a first access token, the operations further including:

determining authorization by the server from the challenge process;
generating a second access token by the server; and
sending the second access token to the first user device.

14. The system according to claim 13, wherein the first user device is a browserless user device.

* * * * *